(12) United States Patent
Oswald et al.

(10) Patent No.: US 10,315,539 B2
(45) Date of Patent: Jun. 11, 2019

(54) CHILD RESTRAINT WITH VEHICLE SEATBELT MANAGEMENT SYSTEM

(71) Applicant: Dorel Juvenile Group, Inc., Foxboro, MA (US)

(72) Inventors: Kevin C. Oswald, Columbus, IN (US); Mei-Hui Lin, Nashville, IN (US); Devin J. Coakley, Bellingham, MA (US); Ryan Hawker, Quincy, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/975,028

(22) Filed: May 9, 2018

(65) Prior Publication Data

US 2018/0326876 A1   Nov. 15, 2018

Related U.S. Application Data

(60) Provisional application No. 62/503,455, filed on May 9, 2017.

(51) Int. Cl.
*B60N 2/28* (2006.01)
*B60N 2/809* (2018.01)

(52) U.S. Cl.
CPC ......... *B60N 2/2866* (2013.01); *B60N 2/2806* (2013.01); *B60N 2/2812* (2013.01); *B60N 2/809* (2018.02); *B60N 2/2887* (2013.01); *B60N 2002/2818* (2013.01)

(58) Field of Classification Search
CPC .......... B60N 2/2866; B60N 2002/2818; B60N 2/2806; B60N 2/2803; B60N 2/2878; B60N 2/809; B60N 2002/2204
See application file for complete search history.

(56) References Cited

U.S. PATENT DOCUMENTS

| | | |
|---|---|---|
| 3,157,432 A | 11/1964 | Watkins |
| 4,521,052 A | 6/1985 | Cone |
| 4,603,903 A | 8/1986 | Moscovitch |
| 4,632,409 A | 12/1986 | Hall |
| 4,798,412 A | 1/1989 | Kohus |
| 4,854,639 A | 8/1989 | Burleigh |
| 5,110,182 A | 5/1992 | Beauvais |
| 5,125,717 A | 6/1992 | Skoeld |
| 5,836,650 A | 11/1998 | Warner |
| D413,026 S | 8/1999 | Reithmeier |
| 6,273,509 B1 | 8/2001 | Reithmeier |
| 6,318,799 B1 | 11/2001 | Greger |
| 6,474,735 B1 | 11/2002 | Carnahan |
| 6,478,377 B2 | 11/2002 | Kassai |
| 6,491,343 B2 | 12/2002 | Yamazaki |
| 9,022,470 B2 | 5/2015 | Fujita |

(Continued)

FOREIGN PATENT DOCUMENTS

| | | | | |
|---|---|---|---|---|
| JP | 2010064737 A | * | 3/2010 | ........... B60N 2/2812 |
| WO | WO-2008147231 A1 | * | 12/2008 | ........... B60N 2/2821 |

*Primary Examiner* — Timothy J Brindley
(74) *Attorney, Agent, or Firm* — Barnes & Thornburg LLP

(57) ABSTRACT

A child restraint is adapted to set on a passenger seat in a vehicle. The child restraint includes a seat bottom and a seat back. The child restraint can be anchored to the vehicle using a LATCH belt. A vehicle seat belt can also be used to anchor the child restraint to the vehicle.

14 Claims, 5 Drawing Sheets

(56) References Cited

U.S. PATENT DOCUMENTS

Figures 1, 2:
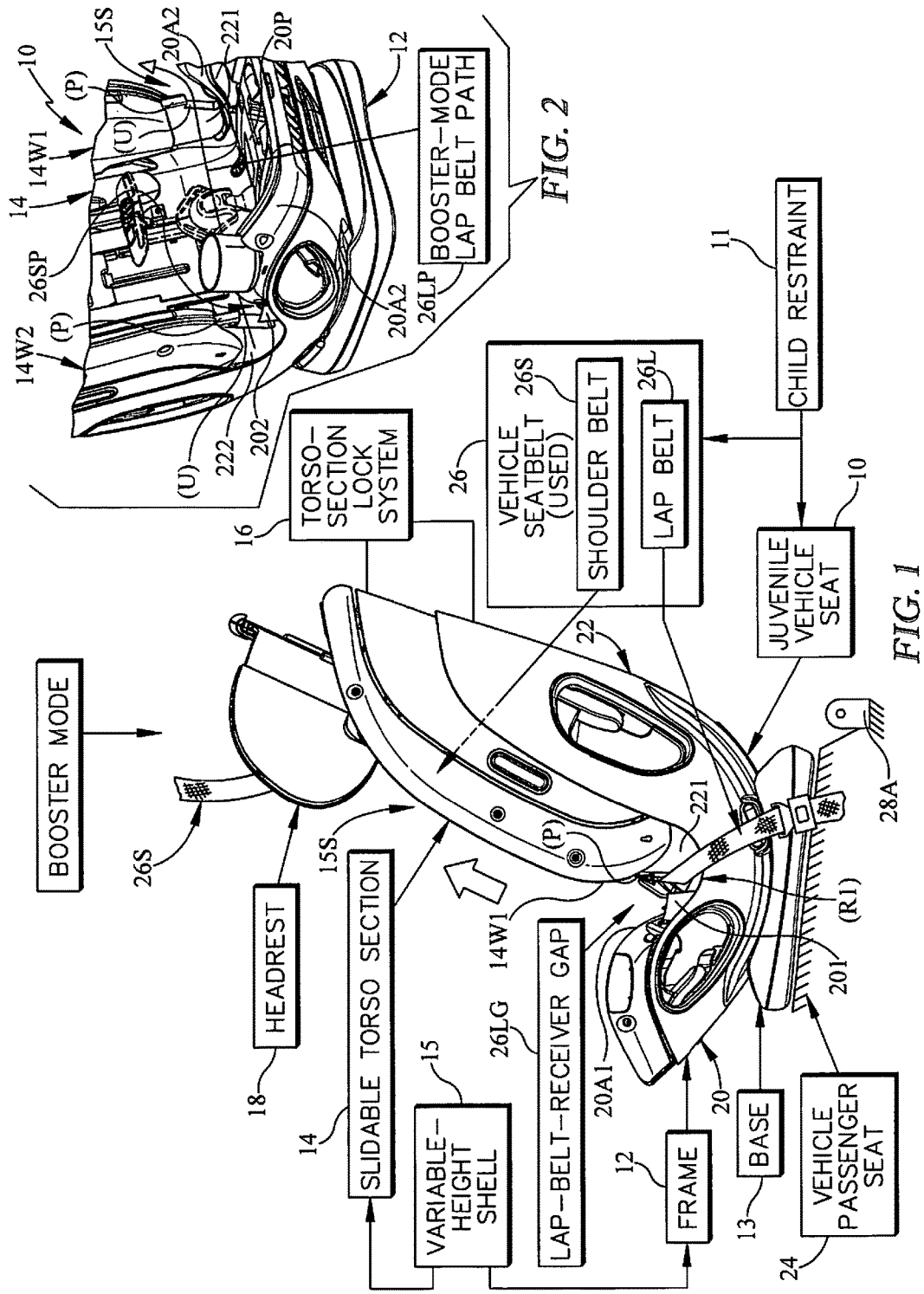

| | | |
|---|---|---|
| 9,126,509 B2 | 9/2015 | Biaud |
| 9,150,126 B1 | 10/2015 | Kitchens et al. |
| 9,358,908 B2 | 6/2016 | Rajasingham |
| 9,499,074 B2 | 11/2016 | Strong et al. |
| 2004/0124677 A1* | 7/2004 | Meeker ............... B60N 2/2806 297/255 |
| 2005/0168025 A1* | 8/2005 | Kespohl ............... B60N 2/2803 297/256.13 |
| 2007/0057547 A1* | 3/2007 | Hartenstine ......... B60N 2/2806 297/256.13 |
| 2008/0030052 A1 | 2/2008 | Chen |
| 2008/0111412 A1 | 5/2008 | Woellert et al. |
| 2011/0148160 A1* | 6/2011 | Meeker ............... B60N 2/2806 297/250.1 |
| 2016/0039319 A1 | 2/2016 | Zhang |
| 2017/0106772 A1* | 4/2017 | Williams ............ B60N 2/2812 |
| 2018/0370392 A1* | 12/2018 | Harmes, V ......... B60N 2/2806 |

\* cited by examiner

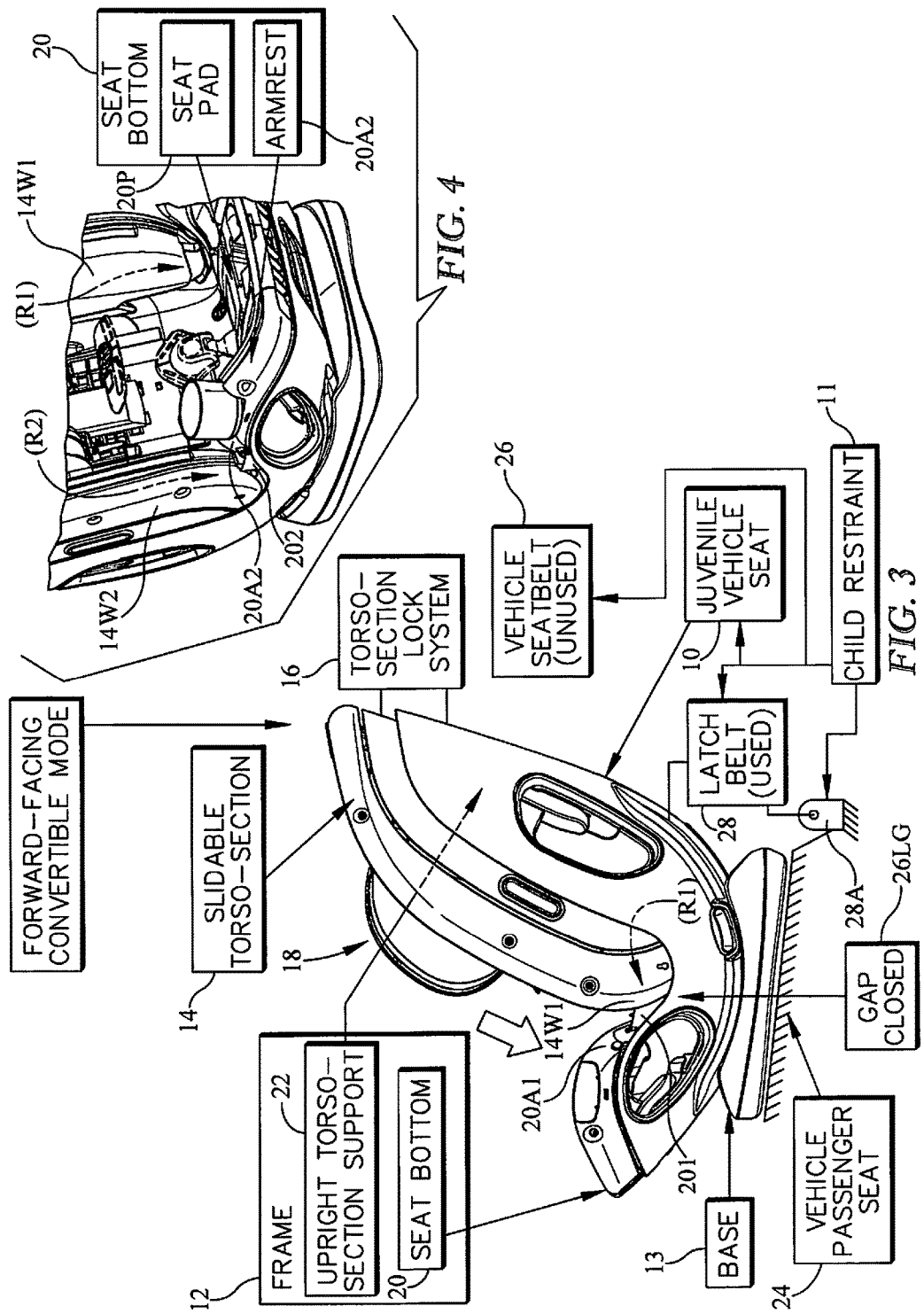

US 10,315,539 B2

CHILD RESTRAINT WITH VEHICLE SEATBELT MANAGEMENT SYSTEM

PRIORITY CLAIM

This application claims priority under 35 U.S.C. § 119(e) to U.S. Provisional Application No. 62/503,455, filed May 9, 2017, which is expressly incorporated by reference herein.

BACKGROUND

The present disclosure relates to child restraints and in particular, to juvenile seats for use on passenger seats in vehicles. More particularly, the present disclosure relates to juvenile seats that are adjustable in size to accommodate growing children.

SUMMARY

According to the present disclosure, a juvenile vehicle seat is adapted to set on a passenger seat in a vehicle. In illustrative embodiments, the juvenile vehicle seat includes a variable-height shell formed to include a child-receiving space that can be expanded and contracted in size at the option of the caregiver. The variable-height shell includes a frame and a slidable torso section.

In illustrative embodiments, the frame is adapted to set on the passenger seat and formed to include the seat bottom. The torso section is mounted for up-and-down sliding movement on a stationary upright torso-section support that is included in the frame and arranged to extend upwardly from a rear edge of the seat bottom. The child-receiving space is expanded in size in response to upward movement of the torso section on the stationary torso-section support of the frame. The child-receiving space is contracted in size in response to downward movement of the torso section on the stationary torso-section support of the frame.

In illustrative embodiments, a caregiver can move the torso section on the frame to place the juvenile vehicle seat in a BOOSTER seat mode to seat taller children or in a forward-facing or rearward-facing CONVERTIBLE CAR-SEAT mode to seat shorter children. Juvenile vehicle seat is held in place on a passenger seat in a vehicle using a vehicle seatbelt associated with the vehicle in the BOOSTER mode and, alternatively, using a LATCH belt associated with the juvenile vehicle seat in the CONVERTIBLE CAR-SEAT mode. In the BOOSTER mode, a lap-belt-receiver gap provided on each side of the juvenile vehicle seat between the frame and the torso section is exposed by elevation of the slidable torso section relative to a seat bottom included in the frame so that a caregiver can pass a lap belt of the vehicle seatbelt through both lap-belt-receiver gaps to help anchor the juvenile vehicle seat in place on the vehicle passenger seat. Also, in the BOOSTER mode, in some embodiments of the present disclosure, a shoulder-belt-receiver channel included in a shoulder belt guide linked to the torso section is exposed to receive a portion of a diagrammatically extending shoulder belt of the vehicle seatbelt. However, in the CONVERTIBLE CAR-SEAT mode, the lap-belt-receiver gaps and any shoulder-belt-receiver channels are hidden to encourage a caregiver to use the LATCH belt to anchor the juvenile vehicle seat in place on the vehicle passenger seat rather than use the lap and shoulder belts of the vehicle seatbelt.

In illustrative embodiments, the child restraint further includes a torso-section lock system comprising means for releasably locking the slidable torso section to the upstanding torso-section support of the frame in one of several elevated positions selected by a caregiver to establish the elevation of the slidable torso section relative to the seat bottom of the frame. A caregiver can operate the torso-section lock system to free the slidable torso section to move up and down on the upstanding torso-section support of the frame so as to change the elevation of the torso section relative to the seat bottom so that the child-receiving space is expanded or contracted.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 5:
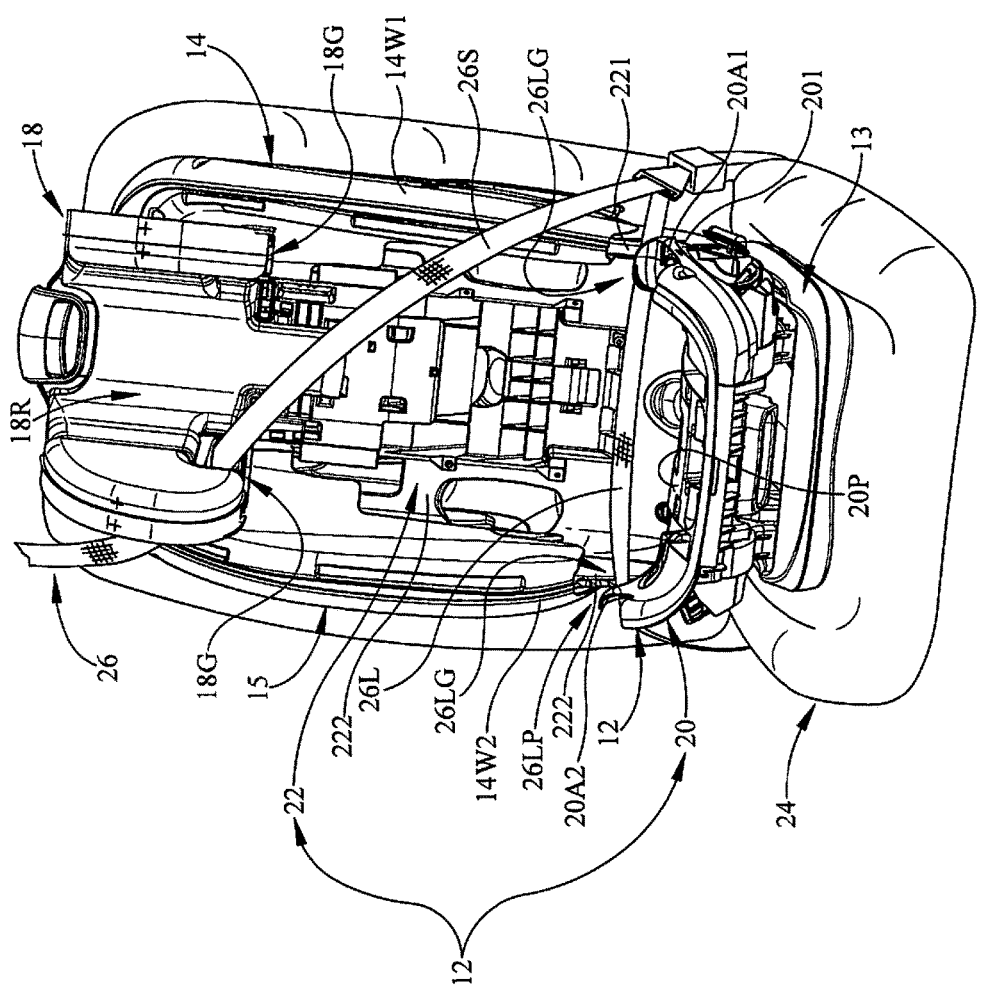
Figure 6:
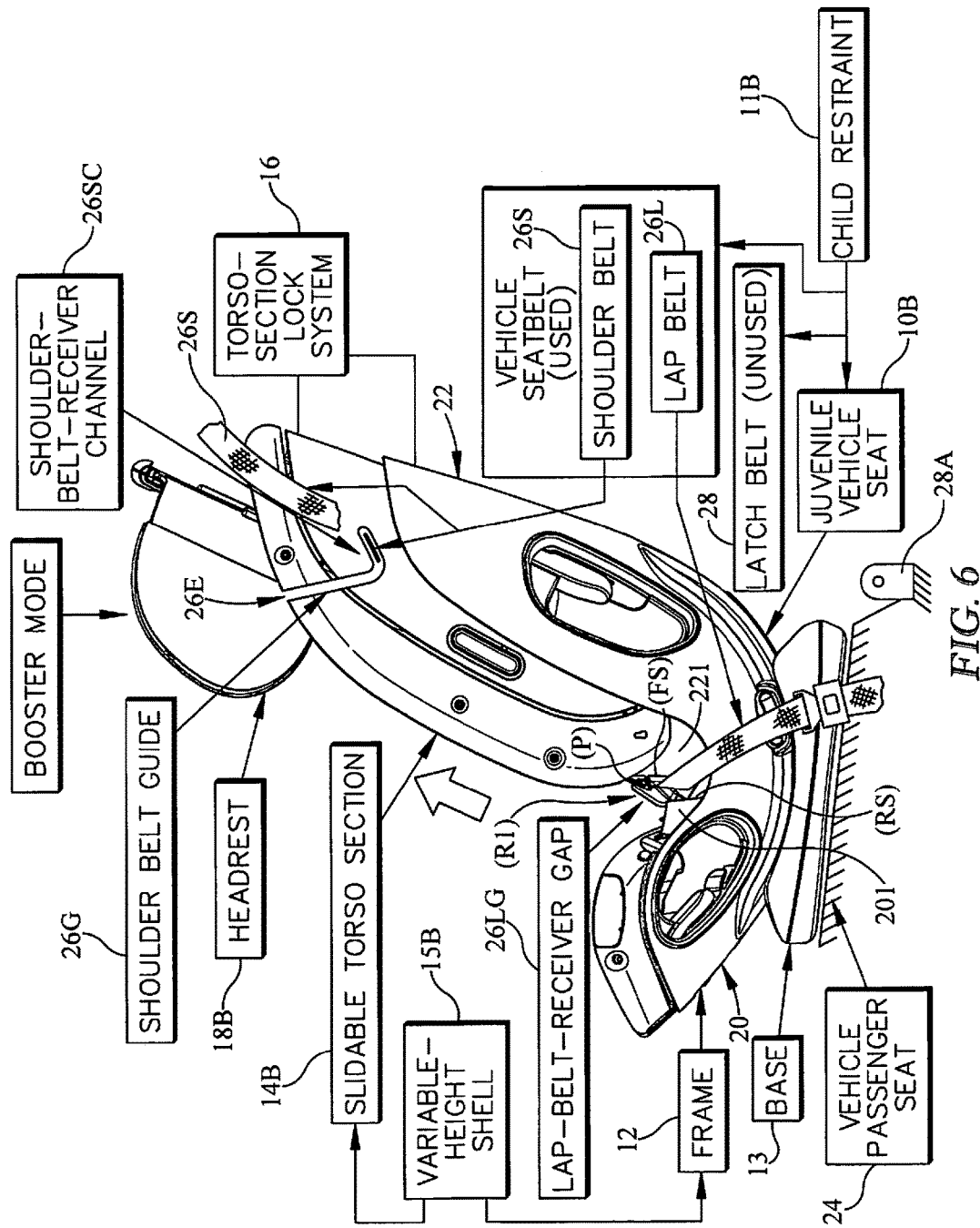
Figure 7:
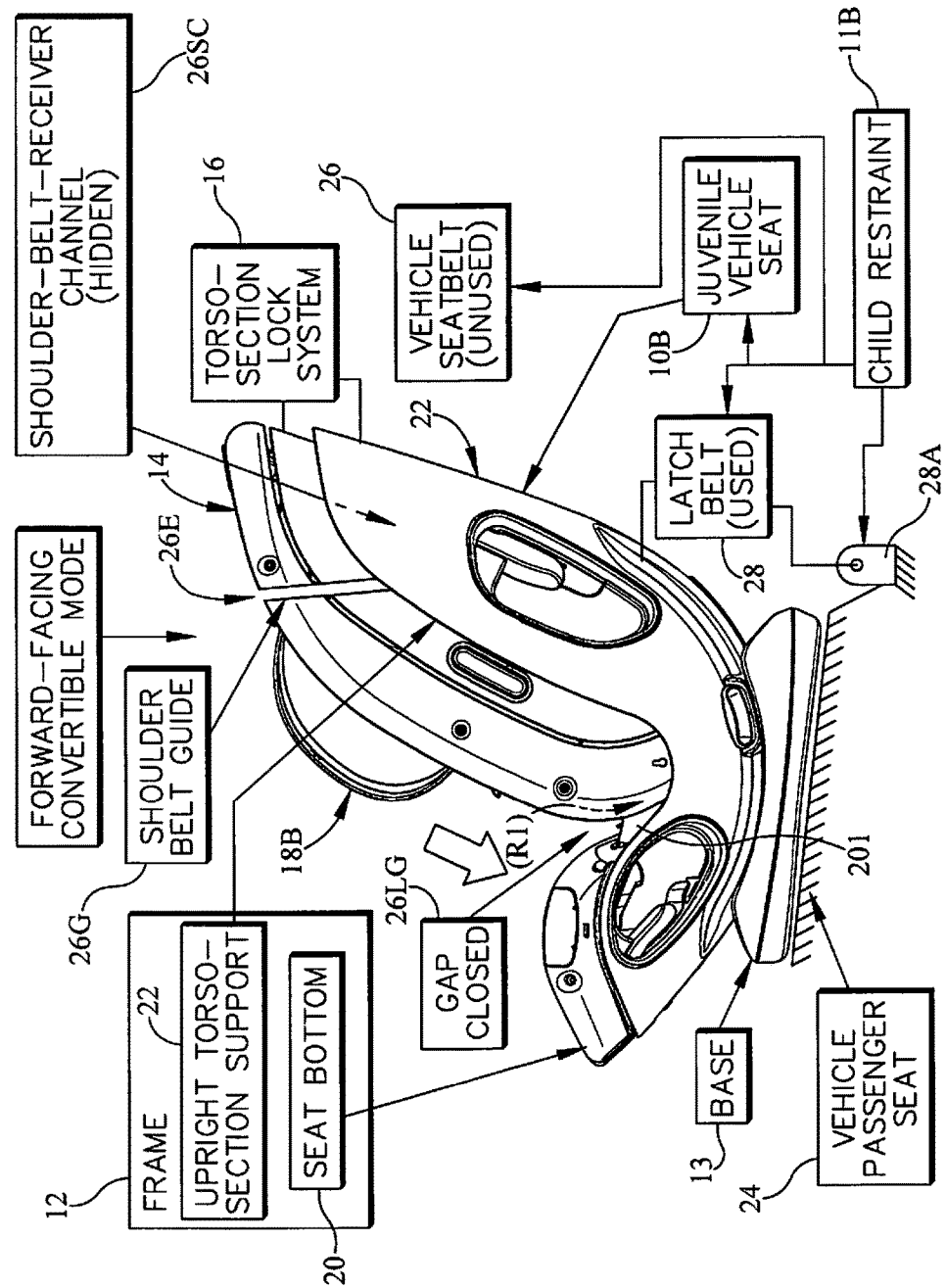

The detailed description particularly refers to the accompanying figures in which:

FIG. 1 is a side-elevation view of a child restraint comprising a juvenile vehicle seat in accordance with a first embodiment of the present disclosure and a vehicle seat belt associated with a passenger seat in a vehicle, and showing the juvenile vehicle seat in a BOOSTER mode to accommodate a relatively taller child seated on the juvenile vehicle seat and also showing that the juvenile vehicle seat in BOOSTER mode is held in a stationary position on the passenger seat using a seat-anchoring vehicle seatbelt associated with the passenger seat and showing that the juvenile vehicle seat includes a frame at rest on a base placed on the passenger seat and a slidable torso section mounted for up-and-down movement on the frame between an elevated position associated with the BOOSTER mode and shown in FIG. 1 and a lowered position associated with a CONVERTIBLE CAR-SEAT mode and shown in FIG. 3 and suggesting that in the BOOSTER mode a lap-belt-receiver gap is exposed between an armrest of the frame and the elevated slidable torso section to receive and retain a portion of a lap belt of the seat-anchoring vehicle seat belt to allow the shoulder and lap belts of the vehicle seatbelt to hold the juvenile vehicle seat and a juvenile seated in that seat on the vehicle passenger seat in the BOOSTER mode;

FIG. 2 is an enlarged perspective view of a portion of the juvenile vehicle seat of FIG. 1 showing that the seat bottom of the frame includes a seat pad located between left and right armrests and showing that the lap-belt-receiver gap is exposed to extend across the width of the seat bottom of the frame from the left armrest, past the seat pad, to the right armrest to provide a booster-mode lap belt path to receive the lap belt of the vehicle seat belt when the juvenile vehicle seat is in the BOOSTER mode;

FIG. 3 is a side-elevation view of a child restraint including the juvenile vehicle seat of FIG. 1 after it has been adapted by a caregiver for use on a vehicle passenger seat in a forward-facing CONVERTIBLE CAR-SEAT mode in which the juvenile vehicle seat is retained on the passenger seat by a LATCH belt associated with the juvenile vehicle seat and showing that the juvenile vehicle seat includes a frame having a stationary seat bottom as shown in FIG. 4, a slidable torso section mounted for up-and-down sliding movement on an upright torso-section support that is included in the frame and arranged to extend upwardly from the seat bottom, and a torso-section lock system arranged to establish the height of the slidable torso section relative to the seat bottom, and showing that the slidable torso section is retained by the torso-section lock system in the lowered position on the torso-section support of the frame to accommodate a relatively shorter child on the juvenile vehicle seat and to cause a lower end of a side wing of the slidable torso section to mate with (or lie in very close proximity to) a rear end of a companion armrest (as shown in FIG. 1) to discourage a caregiver from trying to use the lap belt of a vehicle seatbelt to retain the juvenile vehicle seat on the vehicle passenger seat;

FIG. 4 is a view similar to FIG. 2 but showing the juvenile vehicle seat in the CONVERTIBLE CAR-SEAT mode and showing that the booster-mode lap belt path that was exposed in the BOOSTER mode shown in FIG. 2 is now blocked (from accepting a lap belt) owing to the close proximity of the lower end of the side wing of the slidable torso section to the rear end of the neighboring armrest;

FIG. 5 is an enlarged perspective view of the child restraint of FIG. 1 showing the juvenile vehicle seat in BOOSTER mode wherein the lap belt of the vehicle seatbelt extends along a booster-mode lap belt path through a lap-belt-receiver gap established on a left side of the juvenile vehicle seat, across the seat pad, and through a lap-belt-receiver gap established on a right side of the juvenile vehicle seat and wherein the shoulder belt of the vehicle seatbelt extends diagonally upwardly to pass through a shoulder-belt guide included in a movable headrest included in the juvenile vehicle seat;

FIG. 6 is a side-elevation view of a juvenile vehicle seat in accordance with a second embodiment of the present disclosure shown in a BOOSTER mode to accommodate a relatively taller child seated on the juvenile vehicle seat wherein the juvenile vehicle seat is held in a stationary position on a vehicle passenger seat using a seat-anchoring vehicle seatbelt associated with the vehicle passenger seat and showing that the juvenile vehicle seat includes a frame and a slidable torso section mounted for up-and-down movement on the frame and suggesting that an L-shaped shoulder belt guide is formed in the slidable torso section and that the slidable torso section is movable on the frame between an elevated position associated with the BOOSTER mode and shown in FIG. 6 and a lowered position associated with a CONVERTIBLE CAR-SEAT mode and shown in FIG. 7 and suggesting that in the BOOSTER mode: (1) a positively sloping shoulder-belt-retainer channel of the shoulder belt guide is exposed to receive and retain a shoulder belt of the seat-anchoring vehicle seatbelt and (2) a lap-belt-receiver gap is exposed between an armrest of the frame and the elevated slidable torso section to receive and retain a lap belt of the seat-anchoring vehicle seatbelt so that the shoulder and lap belts of the vehicle seatbelt cooperate to hold the juvenile vehicle seat on the vehicle passenger seat in the BOOSTER mode;

FIG. 7 is a side-elevation view of the juvenile vehicle seat of FIG. 6 after it has been adapted by a caregiver for use on the vehicle passenger seat in a forward-facing CONVERTIBLE CAR-SEAT mode in which the juvenile vehicle seat is retained on the vehicle passenger seat by a LATCH belt associated with the juvenile vehicle seat and showing that the juvenile vehicle seat includes a frame having a stationary seat bottom as shown in FIG. 4, a slidable torso section mounted for up-and-down sliding movement on an upright torso-section support that is included in the frame and arranged to extend upwardly from the stationary seat bottom, and a torso-section lock system arranged to establish the height of the slidable torso section relative to the seat bottom, and showing that the slidable torso section is retained by the torso-section lock system in the lowered position on the torso-section support of the frame to accommodate a relatively shorter child seated on the juvenile vehicle seat and to cause that a lower end of a side wing of the slidable torso section to mate with a rear end of a companion armrest to discourage a caregiver from trying to use the lap belt of a vehicle seatbelt to retain the juvenile vehicle seat on the vehicle passenger seat and to block access to a laterally extending booster-mode lap belt path and to a diagonally extending booster-mode shoulder belt path so that use of a vehicle seatbelt to retain the juvenile vehicle seat on the vehicle passenger seat in the CONVERTIBLE CAR-SEAT mode is discouraged and use of the LATCH belt to anchor the juvenile vehicle seat to the vehicle is encouraged.

DETAILED DESCRIPTION

A juvenile vehicle seat 10 in accordance with a first embodiment of the present disclosure comprises a frame 12, a base 13 under frame 12, and a slidable torso section 14 mounted for up-and-down movement on frame 12 as suggested in FIGS. 1 and 3. Frame 12 and slidable torso section 14 cooperate to define a variable-height shell 15 that is formed to include a child-receiving space 15S that can be expanded in size as shown in FIGS. 1 and 2 to accommodate taller children in a BOOSTER mode of seat 10 or contracted in size as shown in FIGS. 3 and 4 to accommodate shorter children in a CONVERTIBLE CAR-SEAT mode of seat 10 at the option of a caregiver by moving the slidable torso section 14 upwardly or downwardly relative to the companion frame 12.

A lap-belt-receiver gap 26LG is exposed (i.e. revealed) in BOOSTER mode of juvenile vehicle seat 10 as shown in FIG. 1 and is not exposed in CONVERTIBLE CAR-SEAT mode of juvenile vehicle seat 10 as shown in FIG. 3. By revealing gap 26LG in BOOSTER mode, a caregiver is encouraged to use a lap belt 26L and a shoulder belt 26S of a vehicle seatbelt 26 to retain juvenile vehicle seat 10 on passenger seat 24 as suggested in FIGS. 1 and 5. By hiding gap 26LG in CONVERTIBLE CAR-SEAT mode, a caregiver is discouraged from using vehicle seatbelt 26 to retain juvenile vehicle seat 10 on passenger seat 24 and is encouraged to use a LATCH belt 28 coupled to juvenile vehicle seat 10 as suggested in FIGS. 3 and 4 to retain juvenile vehicle seat 10 on passenger seat 24. LATCH stands for Lower Anchors and Tethers for Children.

Juvenile vehicle seat 10 also includes a torso-section lock system 16 as shown diagrammatically in FIGS. 1 and 3. Torso-section lock system 16 is used by a caregiver in accordance with the present disclosure to lock the slidable torso section 14 to the frame 12 in a lowered position associated with the CONVERTIBLE CAR-SEAT mode or one of several elevated positions associated with the BOOSTER mode and selected by the caregiver to establish the size of variable-height shell 15.

In illustrative embodiments, juvenile vehicle seat 10 further comprises a movable headrest 18 that is mounted for up-and-down movement on frame 12 as suggested in FIGS. 1 and 3. A headrest-height controller (not shown) can be used by a caregiver to lock the movable headrest 18 in one of several elevated positions selected by the caregiver to align the movable headrest 18 properly relative to the selected position of the slidable torso section 14 on frame 12.

In illustrative embodiments, frame 12 of juvenile vehicle seat 10 includes a seat bottom 20 and an upright torso-section support 22 arranged to extend upwardly from a rear portion of seat bottom 20 as suggested in FIG. 3. Slidable torso section 14 is arranged to slide up and down on upright torso-section support 22 under the control of a caregiver once torso-section lock system 16 is actuated to free torso section 14 to slide on upright torso-section support 22, as suggested, for example, in FIGS. 1 and 3. Torso section 14 and upright torso-section support 22 cooperate to form a seat back of juvenile vehicle seat 10.

Juvenile vehicle seat 10 is adapted for use by taller children in a belt-positioning BOOSTER mode to be held in place on a vehicle passenger seat 24 using a lap belt 26L and a shoulder belt 26S of a vehicle seatbelt 26 associated with vehicle passenger seat 24 as suggested in FIG. 1. In BOOSTER mode, a lap-belt-receiver gap 26LG is exposed to allow a caregiver to use shoulder and lap belts 26S, 26L of vehicle seatbelt 26 to hold juvenile vehicle seat 10 in place on vehicle passenger seat 24.

In BOOSTER mode, slidable torso section 14 is located in an elevated position on the upright torso-section support 22 of frame 12 as shown in FIG. 1. In such an elevated position, a lap-belt-receiver gap 26LG is exposed on each side of juvenile vehicle seat 10 as suggested in FIGS. 1, 2, and 5. A caregiver can pass lap belt 26L of vehicle seat belt 26 through lap-belt-receiver gaps 26LG to extend laterally across seat bottom 20 in place on vehicle passenger seat 24 as suggested in FIGS. 1 and 2. A first lap-belt-receiver gap 26LG is defined between a lower end of side wing 14W1 of the slidable torso section 14 and a rear end of a neighboring armrest 20A1 of seat bottom 20 when slidable torso section 14 is moved to an elevated position on the upright torso-section support 22 as shown, for example, in FIGS. 1 and 2. A second lap-belt-receiver 26LG is defined between a lower end of side wing 14W2 of the slidable torso section 14 and a rear end of a neighboring armrest 20A1 of seat bottom 20 when slidable torso section 14 is moved to an elevated position on the upright torso-section support 22.

To discourage a caregiver from using lap belt 26L and shoulder belt 26S of vehicle seatbelt 26 to hold juvenile vehicle 10 in place on vehicle passenger seat 24, each of lap-belt-receiver gaps 26LG is closed as suggested in FIG. 3 when juvenile vehicle seat 10 is placed in CONVERTIBLE CAR-SEAT mode to be used by a relatively shorter child. In this mode, a LATCH belt 28 included in juvenile vehicle seat 10 is coupled to a belt anchor 28A included in vehicle passenger seat 24 and provided in a crevice formed between a seat bottom and seat back of vehicle passenger seat 24. In this mode, vehicle seatbelt 26 is not used to hold juvenile vehicle seat 10 in place or vehicle passenger seat 24.

Torso-section lock system 16 comprises means for releasably locking slidable torso section 14 to the upright torso-section support 22 of frame 12 to establish the elevation of slidable torso section 14 relative to seat bottom 20 of frame 12. Slidable torso section 14 is retained in a stationary low-elevation position on upright torso-section support 22 by torso-section lock system 16 as shown in FIG. 3 to provide a small child-receiving space 15S for accommodating a relatively small child in variable-height shell 15 when juvenile vehicle seat 10 is in CONVERTIBLE CAR-SEAT mode. In contrast, slidable torso section 14 is shown in FIG. 1 after it has been unlocked and moved upwardly on upright torso-section support 22 by a caregiver to assume a higher elevation associated with BOOSTER mode of juvenile vehicle seat 10 and then locked in place using torso-section lock system 16 to establish a relatively larger child-receiving space 15S.

In the present disclosure, slidable torso section 14 is able to move upwardly relative to seat bottom 20 to provide additional protection and enhanced sizing for a taller child seated on seat bottom 20. In addition, when slidable torso section 14 moves upwardly it will expose the lap belt path 26LP for BOOSTER mode as suggested in FIGS. 1 and 2. When slidable torso section 14 is in a retracted or position as shown in FIG. 1, the booster-mode lap path 26LP is covered to help minimize confusion by a caregiver during installation of juvenile vehicle seat 10 on a passenger seat 24 in a vehicle.

In the present disclosure, adjustment of the elevation of torso section 14 and headrest 18 relative to seat bottom 20 and relative to one another promotes prolonged use of juvenile vehicle seat 10 as the child grows taller by allowing for proper fitment of differently sized children. When the seated child is younger and smaller juvenile vehicle seat 10 is placed by a caregiver into a forward-facing or rearward-facing CONVERTIBLE CAR-SEAT mode as shown in FIGS. 3 and 4. The present disclosure allows the torso section 14 to move independently of headrest 18 relative to seat bottom 20 to give an additional component that can be adjusted to fit the child better. The belt path for the belt-positioning BOOSTER mode of juvenile vehicle seat 10 is hidden until the child is large enough for juvenile vehicle seat 10 to be expanded by raising torso section 14 as shown in FIG. 1 thereby exposing the booster-mode lap path 26LP as shown in FIGS. 1 and 2. For use of juvenile vehicle seat 10 in the belt-positioning BOOSTER mode, the lap belt path 26LP is exposed at all times in illustrative embodiments.

Movement of torso section 14 on frame 12 in accordance with the present disclosure results in a juvenile vehicle seat 10 that provides the best fit for a child through all early growing stages of the child. The torso section 14 is movable to minimize and/or discourage misuse of the booster-mode belt paths associated with juvenile vehicle seat 10. In a compact state associated with CONVERTIBLE CAR-SEAT mode, torso section 14 is in its lowest position to cover the booster-mode lap-belt path 26LP to discourage a caregiver from routing lap belt 26L through the booster-mode belt path 26LP. This discourages misuse of using the booster-mode lap-belt path 26LP prior to changing juvenile vehicle seat 10 to BOOSTER mode. In accordance with the present disclosure, the shoulder-belt guide 18G provided on each side of movable headrest 18 moves up along frame 12 with a torso section height-adjustment mechanism (not shown) to provide proper height location of shoulder belt 26S relative to seat bottom 20 in BOOSTER mode as a child grows taller to maximize proper fitting of juvenile vehicle seat 10 to the child.

A juvenile vehicle seat 10B in accordance with a second embodiment of the present disclosure comprises a frame 12, a base 13 under frame 12, and a slidable torso section 14B mounted for up-and-down movement on frame 12 as suggested in FIGS. 6 and 7. Frame 12 and slidable torso section 14B cooperate to define a variable-height shell 15B that is formed to include a child-receiving space 15S that can be expanded in size as shown in FIG. 6 to accommodate taller children in a BOOSTER mode of seat 10B or contracted in size as shown in FIG. 7 to accommodate shorter children in a CONVERTIBLE CAR-SEAT mode of seat 10B at the option of a caregiver by moving the slidable torso section 14B upwardly or downwardly relative to the companion frame 12.

A lap-belt-receiver gap 26LG and a shoulder-belt-receiver channel 26SC of a shoulder belt guide 26G are exposed (i.e. revealed) in BOOSTER mode of juvenile vehicle seat 10B as shown in FIG. 6 and are not exposed in CONVERTIBLE CAR-SEAT mode of juvenile vehicle seat 10B as shown in FIG. 7. By revealing gap 26LG and channel 26SC in BOOSTER mode, a caregiver is encouraged to use a lap belt 26L and a shoulder belt 26S of a vehicle seatbelt 26 to retain juvenile vehicle seat 10B on passenger seat 24 as suggested in FIG. 6. By hiding gap 26LG and channel 26SC in CONVERTIBLE CAR-SEAT mode, a caregiver is discouraged from using vehicle seatbelt 26 to retain juvenile vehicle seat 10B on passenger seat 24 and is encouraged to use a LATCH belt 28 coupled to juvenile vehicle seat 10B to retain juvenile vehicle seat 10B on passenger seat 24 as suggested in FIG. 7.

Juvenile vehicle seat 10B also includes a torso-section lock system 16 as shown diagrammatically in FIG. 6. Torso-section lock system 16 is used by a caregiver in accordance with the present disclosure to lock the slidable torso section 14B to the frame 12 in a lowered position associated with the CONVERTIBLE CAR-SEAT mode or one of several elevated positions associated with the BOOSTER mode and selected by the caregiver to establish the size of variable-height shell 15B.

In illustrative embodiments, juvenile vehicle seat 10 further comprises a movable headrest 18B that is mounted for up-and-down movement on frame 12 as suggested in FIGS. 6 and 7. A headrest-height controller (not shown) can be used by a caregiver to lock the movable headrest 18B in one of several elevated positions selected by the caregiver to align the movable headrest 18B properly relative to the selected position of the slidable torso section 14B on frame 12.

In illustrative embodiments, frame 12 of juvenile vehicle seat 10B includes a seat bottom 20 and an upright torso-section support 22 arranged to extend upwardly from a rear portion of seat bottom 20 as suggested in FIG. 6. Slidable torso section 14B is arranged to slide up and down on upright torso-section support 22 under the control of a caregiver once torso-section lock system 16 is actuated to free torso section 14B to slide on upright torso-section support 22, as suggested, for example, in FIG. 6. Torso section 14B and upright torso-section support 22 cooperate to form a seat back of juvenile vehicle seat 10B.

Juvenile vehicle seat 10B is adapted for use by taller children in a belt-positioning BOOSTER mode to be held in place on a vehicle passenger seat 24 using a lap belt 26L and a shoulder belt 26S of a vehicle seatbelt 26 associated with vehicle passenger seat 24 as suggested in FIG. 6. In BOOSTER mode, a shoulder-belt-receiver channel 26SC of a shoulder belt guide 26G is exposed and lap-belt-receiver gap 26LG is exposed to allow a caregiver to use shoulder and lap belts 26S, 26L of vehicle seatbelt 26 to hold juvenile vehicle seat 10B in place on vehicle passenger seat 24.

In BOOSTER mode, slidable torso section 14B is located in an elevated position on the upright torso-section support 22 of frame 12 as shown in FIG. 6. In such an elevated position, a shoulder-belt-receiver channel 26SC of shoulder belt guide 26G included in slidable torso section 14B (not movable headrest 18B) is exposed so that it can be seen by the caregiver to encourage the caregiver to pass shoulder belt 26S of vehicle seat belt 26 downwardly through an entry channel 26E of shoulder belt guide 26G and into shoulder-belt-receiver channel 26SC (see, for example, FIG. 7) to cause shoulder belt 26S to extend diagonally along a booster-mode shoulder belt path 26SP. As the elevation of slidable torso section 14B changes relative to seat bottom 20, the height of shoulder belt guide 26G changes so that shoulder belt guide 26G is always positioned at a proper elevation relative to seat bottom 20 in response to up-and-down movement of slidable torso section 14B on upright torso-section support 22. A shoulder belt guide 26G is provided on each side of slidable torso section 14B.

A lap-belt-receiver gap 26LG is exposed when juvenile vehicle seat 10B is placed in BOOSTER mode as suggested in FIG. 6. A caregiver can pass lap belt 26L of vehicle seat belt 26 through lap-belt-receiver gap 26LG to extend laterally across seat bottom 20 in place on vehicle passenger seat 24 as suggested in FIG. 6. Lap-belt-receiver gap 26LG is defined between a lower end of side wing 14W1 of the slidable torso section 14 and a rear end of a neighboring armrest 20A1 of seat bottom 20 when slidable torso section 14 is moved to an elevated position on the upright torso-section support 22 as shown, for example, in FIGS. 1 and 2. A second lap-belt-receiver 26LG is defined between a lower end of side wing 14W2 of the slidable torso section 14B and a rear end of a neighboring armrest 20A1 of seat bottom 20 when slidable torso section 14B is moved to an elevated position on the upright torso-section support 22.

To discourage a caregiver from using lap belt 26L and shoulder belt 26S of vehicle seatbelt 26 to hold juvenile vehicle 10B in place on vehicle passenger seat 24, lap-belt-receiver gap 26LG and shoulder-belt-receiver channel 26SC are hidden/closed as shown in FIG. 7 when juvenile vehicle seat 10B is placed in CONVERTIBLE CAR-SEAT mode to be used by a relatively shorter child. In this mode, a LATCH belt 28 included in juvenile vehicle seat 10B is coupled to a belt anchor 28A included in vehicle passenger seat 24 and provided in a crevice formed between a seat bottom and seat back of vehicle passenger seat 24. In this mode, vehicle seatbelt 26 is not used to hold juvenile vehicle seat 10B in place or vehicle passenger seat 24.

Torso-section lock system 16 comprises means for releasably locking slidable torso section 14B to the upright torso-section support 22 of frame 12 to establish the elevation of slidable torso section 14B relative to seat bottom 20 of frame 12. Slidable torso section 14B is retained in a stationary low-elevation position on upright torso-section support 22 by torso-section lock system 16 as shown in FIG. 7 to provide a small child-receiving space 15S for accommodating a relatively small child in variable-height shell 15B when juvenile vehicle seat 10B is in CONVERTIBLE CAR-SEAT mode. In contrast, slidable torso section 14B is shown in FIG. 6 after it has been unlocked and moved upwardly on upright torso-section support 22 by a caregiver to assume a higher elevation associated with BOOSTER mode of juvenile vehicle seat 10B and then locked in place using torso-section lock system 16 to establish a relatively larger child-receiving space 15S.

In the present disclosure, slidable torso section 14B is able to move upwardly relative to seat bottom 20 to provide additional protection and enhanced sizing for a taller child seated on seat bottom 20. In addition, when slidable torso section 14B moves upwardly it will expose the lap and shoulder belt paths 26LP, 26SP for BOOSTER mode as suggested in FIG. 6. When slidable torso section 14 is in a retracted or position as shown in FIG. 6, the booster-mode lap and shoulder belt paths 26LP, 26SP are covered to help minimize confusion by a caregiver during installation of juvenile vehicle seat 10B on a passenger seat 24 in a vehicle.

In the present disclosure, adjustment of the elevation of torso section 14B and headrest 18B relative to seat bottom 20 and relative to one another promotes prolonged use of juvenile vehicle seat 10B as the child grows taller by allowing for proper fitment of differently sized children. When the seated child is younger and smaller juvenile vehicle seat 10B is placed by a caregiver into a forward-facing or rearward-facing CONVERTIBLE CAR-SEAT mode as shown in FIG. 7. The present disclosure allows the torso section 14B to move independently of headrest 18B relative to seat bottom 20 to give an additional component that can be adjusted to fit the child better. The belt path for the belt-positioning BOOSTER mode of juvenile vehicle seat 10B is hidden until the child is large enough for juvenile vehicle seat 10B to be expanded by raising torso section 14B as shown in FIG. 6 thereby exposing the booster-mode lap and shoulder belt paths 26LP, 26SP as shown in FIG. 6. For use of juvenile vehicle seat 10B in the belt-positioning BOOSTER mode, the lap and shoulder belt paths 26LP, 26SP is exposed at all times in illustrative embodiments.

A shoulder belt guide 26G is provided on a slidable torso section 14B in accordance with the present disclosure as suggested in FIG. 6. When juvenile vehicle seat 10B is used in BOOSTER mode, the shoulder belt 26S is routed through the shoulder belt guide 26G. The shoulder belt 26S remains in the shoulder belt guide 26G during up-and-down sliding movement of slidable torso section 14B on frame 12 of juvenile car seat 10B. The shoulder belt height relative to the stationary seat bottom 20 of frame 12 is adjusted up and down automatically as slidable torso section 14B is moved up and down on frame 12 to adapt to the size of the child seated on seat bottom 20.

Movement of torso section 14B on frame 12 in accordance with the present disclosure results in a juvenile vehicle seat 10B that provides the best fit for a child through all early growing stages of the child. The torso section 14B is movable to minimize and/or discourage misuse of the booster-mode belt paths associated with juvenile vehicle seat 10B. In a compact state associated with CONVERTIBLE CAR-SEAT mode, torso section 14B is in its lowest position to cover the booster-mode lap-belt 26LP and shoulder-belt path 26SP to discourage a caregiver from routing lap belt 26L and shoulder belt 26S1 through the booster-mode belt paths 26LP, 26SP. This discourages misuse of using the booster-mode lap-belt paths 26LP, 26SP prior to changing juvenile vehicle seat 10B to BOOSTER mode.

In accordance with the present disclosure, the shoulder belt guide 26G on each side of slidable torso section 14B moves up along frame 12 with a torso section height-adjustment mechanism (not shown) to provide proper height location of shoulder belt 26S relative to seat bottom 20 in BOOSTER mode as a child grows taller to maximize proper fitting of juvenile vehicle seat 10B to the child. When torso section 14B is in the lowest position that is associated with CONVERTIBLE CAR-SEAT mode, the booster shoulder belt path 26SP will be covered to minimize confusion by a caregiver installing juvenile vehicle seat 10B in the vehicle. In BOOSTER mode, the booster shoulder belt path of juvenile vehicle seat 10B moves up along upright torso-section support 22 of frame 12 to provide proper belt sizing to the child. When torso section 14B moves upwardly it will expose the shoulder belt guide 16 (path) for BOOSTER mode.

In accordance with the present disclosure, change of the shoulder belt path is a function of up-and-down movement of torso section 14B and is independent of up-and-down movement of headrest 18B relative to torso section 14B or frame 12. This shoulder belt path adjustment provides prolonged use of juvenile vehicle seat 10 as the child grows, by allowing for proper fitment of differently sized children. For the belt-positioning BOOSTER mode, the shoulder belt path is exposed at all times in illustrative embodiments of the present disclosure. Juvenile vehicle seat 10B is configured in accordance with the present disclosure to allow each booster shoulder belt guide 26G (path) to move independently of headrest 18B to provide an additional adjustment component to provide better fit for the child. The shoulder belt guide 26G (path) for belt-positioning BOOSTER mode are hidden from caregiver view until the child is large enough for variable-size shell 15B to be expanded from CONVERTIBLE CAR-SEAT mode to BOOSTER mode, thereby exposing the shoulder belt guide 26G (paths).

A child restraint 11B in accordance with the present disclosure comprises a juvenile vehicle seat 10B and a vehicle seat belt 26. Juvenile vehicle seat 10B includes a variable-height shell 15B formed to include a child-receiving space 15S that can be expanded and contracted in size at the option of a caregiver. Variable-height shell 15B includes a frame 12 having a seat bottom 20 and an upright torso-section support 22 arranged to extend upwardly from seat bottom 20 as suggested in FIGS. 1, 3, 5, and 6. Variable-height shell 15B also includes a slidable torso section 14B. The slidable torso section 14B is mounted for up-and-down sliding movement on the upright torso-section support 22 to establish either a BOOSTER mode or a CONVERTIBLE-CAR-SEAT mode of variable-height shell 15B.

In the BOOSTER mode, the slidable torso section 14B is retained in an elevated position on the upright torso-section support 22 above seat bottom 20 as suggested in FIG. 1. In this elevated position, the slidable torso section 14B and the underlying seat bottom 20 cooperate to establish closable gap means for providing an exposed lap-belt-receiver gap 26LG between seat bottom 20 and the slidable torso section 14B on each side of variable-height shell 15B to allow a caregiver to pass a lap belt 26L of a vehicle seat belt 26 through both lap-belt-receiver gaps 26LG while variable-height shell 15B is positioned on a passenger seat 24 in a vehicle associated with the vehicle seat belt 26 so that variable-height shell 15B is anchored in place on passenger seat 24 of the vehicle as suggested in FIGS. 1, 5, and 6.

In the CONVERTIBLE-CAR-SEAT mode, the slidable torso section 14B is retained in a lowered position on torso-section support 22 that is relatively closer to seat bottom 20 than the elevated position as suggested in FIG. 3. In this lowered position, the slidable torso section 14B and the underlying seat bottom 20 cooperate to close both of the lap-belt-receiver gaps 26LG so that the lap belt-receiver gaps 26LG are hidden to encourage a caregiver to use a separate seat-anchoring latch belt 28 linked to variable-height shell 15B to anchor variable-height shell 15B of juvenile vehicle seat 10B in place on passenger seat 24 of the vehicle instead of a lap belt 26L of a vehicle seat belt 26 as suggested in FIGS. 3, 4, and 7.

Juvenile vehicle seat 10B further includes torso-section lock means 16 coupled to variable-height shell 15B for retaining the slidable torso section 14B in the lowered position on the upright torso-section support 22 to close the lap-belt-receiver gaps 26LG provided between seat bottom 20 and the slidable torso section 14B as suggested in FIGS. 3 and 7. In such a lowered position, the lap-belt-receiver gaps 26LG are closed to discourage a caregiver from trying to anchor variable-height shell 15B of juvenile vehicle seat 10 in place on passenger seat 24 of the vehicle using lap belts 26L of a vehicle seat belt 26 associated with the vehicle.

Seat bottom 20 of frame 12 includes a first armrest 20A1, a second armrest 20A2 (see, for example, FIG. 4) arranged to lie in laterally spaced-apart relation to first armrest 20A1, and a seat pad 20P located between the first and second armrests 20A1, 20A2. The slidable torso section 14B includes first and second side wings 14W1, 14W2 see, for example, FIG. 4). First side wing 14W1 is arranged to extend in a forward direction away from a first-side portion 221 of the torso-section support 22 as suggested in FIG. 5 and to lie above and in alignment with first armrest 20A1 during up-and-down movement of the slidable torso section 14B on the torso-support section 22 relative to the upright torso-section support 22 and seat bottom 20. Second side wing 14W2 is arranged to lie in laterally spaced-apart relation to first side wing 14W1 and to extend in a forward direction away from a second-side portion 222 of the upright torso-section support 22 as suggested in FIG. 5 and to lie above and in alignment with second armrest 20A2 during up-and-down movement of the slidable torso section 14B relative to the upright torso-section support 22 and seat bottom 20.

A first of the lap-belt-receiver gaps 26LG is exposed and formed between a lower end of first side wing 14W1 and a rear end of first armrest 20A1 when the slidable torso section 14B is retained in the elevated position to receive a portion of a lap belt 26L of a vehicle seat belt 26 therein. A second of the lap-belt-receiver gaps 26LG is exposed and formed between a lower end of second side wing 14W2 and a rear end of second armrest 20A2 when the slidable torso section 14B is retained in the elevated position to receive another portion of a lap belt 26L of a vehicle seat belt 26 therein and to cooperate with the first of the lap-belt-receiver gaps 26LG to establish a booster-mode lap belt path over seat pad 20P when the slidable torso section 14B is retained in the elevated position.

A lower end of first side wing 14W1 lies in close proximity to a rear end of first armrest 20A1 to close the first of the lap-belt-receiver gaps 26LG when the slidable torso section 14B is retained in the lowered position to block reception of a portion of a lap belt 26L of a vehicle seat belt 26 between first armrest 20A1 and first side wing 14W1. A lower end of second side wing 14W2 lies in close proximity to rear end of second armrest 20A2 to close the second of the lap-belt-receiver gaps 26LG when the slidable torso section 14B is retained in the lowered position to block reception of another portion of a lap belt 26L of a vehicle seat belt 26 between second armrest 20A2 and second side wing 14W2.

First-side portion 221 of the upright torso-section support 22 cooperates with a first-side portion 201 of seat bottom 20 to form therebetween a first upwardly opening lap-belt receiver (R1) aligned with first armrest 20A1 of seat bottom 20 and sized to receive a first portion of a lap belt 26L of a vehicle seat belt 26S therein when the variable-height shell 15B is placed in BOOSTER mode on a vehicle passenger seat 24 associated with vehicle seat belt 26S as suggested in FIGS. 1, 5, and 6. Second-side portion 222 of the upright torso-section support 22 cooperates with a second-side portion 202 of seat bottom 20 to form therebetween a second upwardly opening lap-belt receiver (R2) aligned with second armrest 20A2 of seat bottom 20 and sized to receive a second portion of lap belt 26L of vehicle seat belt 26S therein when the variable-height shell 15B is placed in BOOSTER mode as suggested in FIGS. 2 and 5.

The slidable torso section 14 is mounted for movement on the upright torso-section support 22 away from seat bottom 20 to assume an elevated position shown in FIGS. 1 and 6 to separate a lower end of first side wing 14W1 from a rear end of first armrest 20A1 to uncover the first upwardly opening lap-belt receiver (R1) formed in frame 12 to expose a first lap-belt receiver gap 26LG provided between first side wing 14W1 and first armrest 20A1 as suggested in FIGS. 1 and 2 and to separate a lower end of second side wing 14W2 from a rear end of second armrest 20A2 of uncover the second upwardly opening lap-belt receiver (R2) formed in frame 12 to expose a second lap-belt receiver gap 26LG provided between second side wing 14W2 and second armrest 20A2 as suggested in FIG. 2 to establish a booster-mode lap belt path 26LP through the uncovered first and second upwardly opening lap-belt receivers (R1), (R2) formed in frame 12.

The slidable torso section 14 is mounted for movement on the upright torso-section 22 support toward seat bottom 20 away from the elevated position to assume a lowered position as shown in FIGS. 3 and 7 to cause the lower end of first side wing 14W1 to lie in close proximity to the rear end of first armrest 20A1 to cover the first upwardly opening lap-belt receiver (R1) formed in frame 12 and close the first lap-belt receiver gap 26LG as suggested in FIG. 4 and to cause the lower end of second side wing 14W2 to lie in close proximity to the rear end of second armrest 20A2 to cover the second upwardly opening lap-belt receiver (R2) formed in frame 12 and close the second lap-belt receiver gap 26LG as suggested in FIG. 4 to block reception of lap belt 26L in the first and second upwardly lap-belt receivers (R1, R2) formed in frame 12 when variable-height shell 15B is in the CONVERTIBLE-CAR-SEAT mode.

First armrest 14W1 includes a rearwardly facing surface (RS) and first-side portion 221 of the upright torso-section support 22 includes a forwardly facing surface (FS) that cooperates with the rearwardly facing surface (RS) of first armrest 14W1 to define the first upwardly lap-belt receiver (R1) therebetween as suggested in FIG. 6. First-side portion 221 of the upright torso-section support 22 further includes a nose-shaped projection (P) arranged to lie above and overhang the forwardly facing surface (FS) to form a lap-belt receiving undercut (U) as suggested in FIG. 6. The nose-shaped projection (P) and the forwardly facing surface (FS) of first-side portion 221 of the upright torso-section support 22 are covered by the slidable torso section 14 when the slidable torso section 14 occupies the lowered position on the upright torso-section support 22 as suggested in FIG. 7. The slidable torso section 14 and the upright torso-section support 22 cooperate to form a seat back that is arranged to extend upwardly from seat bottom 20 as suggested in FIG. 5.

Juvenile vehicle seat 10B further includes a torso-section lock 16 coupled to frame 12 and to the slidable torso section 14B as suggested in FIG. 1. Torso-section lock 16 is configured to retain the slidable torso section 14B temporarily in the elevated position on the upright torso-section support 22 to establish a relatively larger child-receiving space 15S in variable-height shell 15B and to open both of the lap-belt-receiver gaps 26LG to establish the booster-mode lap belt path over seat pad 20P as suggested in FIGS. 5 and 6. Alternatively, torso-section lock 16 may be used to retain the slidable torso section 14B in the lowered position on the upright torso-section support 22 to establish a relatively smaller child-receiving space 15S in variable-height shell 15B and to close both of the lap-belt-receiver gaps 26LG to disable the booster-mode lap belt path over seat pad 20P as suggested in FIGS. 3 and 4. The slidable torso section 14B and the upright torso-section support 22 cooperate to form a seat back that is arranged to extend upwardly from seat bottom 20.

The slidable torso section 14B is formed to include a shoulder-belt-receiver channel 26SC that is sized to receive a portion of a shoulder belt 26S of a vehicle seat belt 26 in the BOOSTER mode of variable-height shell 15B while lap-belt-receiver gaps 26LG between seat bottom 20 and the slidable torso section 14B are exposed to receive portions of the lap belt 26L of the vehicle seat belt 26 in the BOOSTER mode of variable-height shell 15B. The slidable torso section 14B is also formed to include a shoulder-belt entry channel 26E having an inlet at one end to receive a portion of the shoulder belt 26S of the vehicle seat belt 26 and an outlet at an opposite end opening into the shoulder-belt-receiver channel 26SC to transfer a portion of the shoulder belt 26S moving downwardly in the shoulder-belt entry channel 26E toward seat bottom 20 into the shoulder-belt-receiver channel 26SC in the BOOSTER mode of variable-height shell 15B to establish a diagonally extending booster-mode shoulder belt path on juvenile vehicle seat 10B.

The upright torso-support section 22 is formed to include a shield that surrounds a portion of the slidable torso section 14B. Shield is sized to uncover and expose the shoulder-belt-receiver channel 26SC formed in the slidable torso section 14B when variable-height shell 15B is in the BOOSTER mode and to cover and hide the shoulder-belt-receiver channel 26SC formed in the slidable torso section 14B when variable-height shell is in the CONVERTIBLE-CAR-SEAT mode to encourage a caregiver to use a separate latch belt 28 linked to variable-height shell 15B to anchor variable-height shell 15B in place on passenger seat 24 of the vehicle instead of a shoulder belt 26S of a vehicle seat belt 26.

Juvenile vehicle seat 10B further includes a movable headrest 18B mounted for up-and-down movement on the upright torso-section support 22 of frame 12 relative to the slidable torso section 14B and to the shoulder-belt-receiver channel 26SC formed in the slidable torso section 14B to allow the movable headrest 18B to move independently of the slidable torso section 14. The slidable torso section 14B is configured to provide means for retaining the portion of the shoulder belt 26 received in the shoulder-belt-receiver channel 26SC during up-and-down movement of the slidable torso section 14B on the upright torso-section support 22.

The invention claimed is:

1. A child restraint comprising
a juvenile vehicle seat including a variable-height shell formed to include a child-receiving space that can be expanded and contracted in size at the option of a caregiver, the variable-height shell including a frame having a seat bottom and an upright torso-section support arranged to extend upwardly from the seat bottom and a slidable torso section mounted for up-and-down sliding movement on the upright torso-section support to establish one of a booster mode of the variable-height shell in which the slidable torso section is retained in an elevated position on the upright torso-section support above the seat bottom to expose a lap-belt-receiver gap between the seat bottom and the slidable torso section on each side of the variable-height shell to allow a caregiver to pass a lap belt of a vehicle seat belt through both lap-belt-receiver gaps while the variable-height shell is positioned on a passenger seat in a vehicle associated with the vehicle seat belt so that the variable-height shell is anchored in place on the passenger seat of the vehicle and a convertible-car-seat mode in which the slidable torso section is retained in a lowered position on the torso-section support that is relatively closer to the seat bottom to close both of the lap-belt-receiver gaps so that the lap belt-receiver gaps are hidden.

2. The child restraint of claim 1, wherein the seat bottom of the frame includes a first armrest, a second armrest arranged to lie in laterally spaced-apart relation to the first armrest, and a seat pad located between the first and second armrests, the slidable torso section includes a first side wing arranged extend in a forward direction away from the upright torso-section support and to lie above and in alignment with the first armrest during up-and-down movement of the torso-section support on the torso-support section relative to the upright torso-section support and the seat bottom and a second side wing arranged to lie in laterally spaced-apart relation to the first side wing and to extend in a forward direction away from the upright torso-section support and to lie above and in alignment with the second armrest during up-and-down movement of the slidable torso section relative to the upright torso-section support and the seat bottom, a first of the lap-belt-receiver gaps is exposed and formed between a lower end of the first side wing and a rear end of the first armrest when the slidable torso section is retained in the elevated position to receive a portion of a lap belt of a vehicle seat belt therein, a second of the lap-belt-receiver gaps is exposed and formed between a lower end of the second side wing and a rear end of the second armrest when the slidable torso section is retained in the elevated position to receive another portion of a lap belt of a vehicle seat belt therein and to cooperate with the first of the lap-belt-receiver gaps to establish a booster-mode lap belt path over the seat pad when the slidable torso section is retained in the elevated position, the lower end of the first side wing lies in close proximity to the rear end of the first armrest to close the first of the lap-belt-receiver gaps when the slidable torso section is retained in the lowered position to block reception of a portion of a lap belt of a vehicle seat belt between the first armrest and the first side wing, and the lower end of the second side wing lies in close proximity to the rear end of the second armrest to close the second of the lap-belt-receiver gaps when the slidable torso section is retained in the lowered position to block reception of another portion of a lap belt of a vehicle seat belt between the second armrest and the second side wing.

3. The child restraint of claim 2, wherein the juvenile vehicle seat further includes a torso-section lock coupled to the frame and to the slidable torso section and configured to retain the slidable torso section temporarily in the elevated position on the upright torso-section support to establish a relatively larger child-receiving space in the variable-height shell and to open both of the lap-belt-receiver gaps to establish the booster-mode lap belt path over the seat pad and alternatively to retain the slidable torso section in the lowered position on the upright torso-section support to establish a relatively smaller child-receiving space in the variable-height shell and to close both of the lap-belt-receiver gaps to disable the booster-mode lap belt path over the seat pad.

4. The child restraint of claim 3, wherein the slidable torso section and the upright torso-section support cooperate to form a seat back that is arranged to extend upwardly from the seat bottom.

5. The child restraint of claim 1, wherein the juvenile vehicle seat further includes torso-section lock means coupled to the variable-height shell for retaining the slidable torso section in the lowered position on the upright torso-support section to close the lap-belt-receiver gaps provided between the seat bottom and the slidable torso section to discourage a caregiver from trying to anchor the variable-height shell of the juvenile vehicle seat in place on the passenger seat of the vehicle using lap belts of a vehicle seat belt associated with the vehicle.

6. The child restraint of claim 1, wherein the slidable torso section is formed to include a shoulder-belt-receiver channel that is sized to receive a portion of a shoulder belt of a vehicle seat belt in the booster mode of the variable-height shell while lap-belt-receiver gaps between the seat bottom and the slidable torso section are exposed to receive portions of the lap belt of the vehicle seat belt in the booster mode of the variable-height shell, the slidable torso section is also formed to include a shoulder-belt entry channel having an inlet at one end to receive a portion of the shoulder belt of the vehicle seat belt and an outlet at an opposite end opening into the shoulder-belt-receiver channel to transfer a portion of the shoulder belt moving downwardly in the shoulder-belt entry channel toward the seat bottom into the shoulder-belt-receiver channel in the booster mode of the variable-height shell to establish a diagonally extending booster-mode shoulder belt path on the juvenile vehicle seat, and the upright torso-section support is formed to include a shield that surrounds a portion of the slidable torso section and that is sized to uncover and expose the shoulder-belt-receiver channel formed in the slidable torso section when the variable-height shell is in the booster mode and to cover and hide the shoulder-belt-receiver channel formed in the slidable torso section when the variable-height shell is in the convertible-car-seat mode to encourage a caregiver to use a separate latch belt linked to the variable-height shell to anchor the variable-height shell in place on the passenger seat of the vehicle instead of a shoulder belt of a vehicle seat belt.

7. The child restraint of claim 6, wherein the juvenile vehicle seat further includes a movable headrest mounted for up-and-down movement on the upright torso-section support of the frame relative to the slidable torso section and to the shoulder-belt-receiver channel formed in the slidable torso section to allow the movable headrest to move independently of the slidable torso section.

8. The child restraint of claim 6, wherein the slidable torso section is configured to provide means for retaining the portion of the shoulder belt received in the shoulder-belt-receiver channel during up-and-down movement of the slidable torso section on the upright torso-section support.

9. The child restraint of claim 1, wherein the slidable torso section and the upright torso-section support cooperate to form a seat back that is arranged to extend upwardly from the seat bottom.

10. A child restraint comprising
a juvenile vehicle seat including a variable-height shell that is formed to include a child-receiving space that can be expanded in size at the option of a caregiver to accommodate taller children in a booster mode of the variable-height shell or contracted in size at the option of the caregiver to accommodate shorter children in a convertible car-seat mode of the variable-height shell, the variable-height shell including a frame having a seat bottom, an upright torso-section support arranged to extend upwardly from the seat bottom, and a slidable torso section mounted on the upright torso-section support for the up-and-down movement relative to the seat bottom during change of the variable-height shell between booster mode and convertible-car-seat mode,
wherein the seat bottom includes a first armrest, a second armrest arranged to lie in laterally spaced-apart relation to the first armrest, and a seat pad located between the first and second armrests,
wherein the slidable torso section includes a first side wing arranged to extend in a forward direction away from a first-side portion of the upright torso-section support and to lie above and in alignment with the first armrest of the seat bottom during up-and-down movement of the slidable torso section relative to the upright torso-section support and the seat bottom,
wherein the slidable torso section also includes a second side wing arranged to lie in laterally spaced-apart relation to the first side wing and to extend in a forward direction away from a second-side portion of the upright torso-section support and to lie above and in alignment with the second armrest of the seat bottom during up-and-down movement of the slidable torso section relative to the upright torso-section support and the seat bottom,
wherein the first-side portion of the upright torso-section support cooperates with a first-side portion of the seat bottom to form therebetween a first upwardly opening lap-belt receiver aligned with the first armrest of the seat bottom and sized to receive a first portion of a lap belt of a vehicle seat belt therein when the variable-height shell is placed in the booster mode on a passenger seat associated with the vehicle seat belt,
wherein the second-side portion of the upright torso-section support cooperates with a second-side portion of the seat bottom to form therebetween a second lap-belt receiver aligned with the second armrest of the seat bottom and sized to receive a second portion of the lap belt therein when the variable-height shell is placed in the booster mode,
wherein the slidable torso section is mounted for movement on the upright torso-section support away from the seat bottom to assume an elevated position to separate a lower end of the first side wing from a rear end of the first armrest to uncover the first upwardly opening lap-belt receiver formed in the frame to expose a first lap-belt receiver gap provided between the first side wing and the first armrest and to separate a lower end of the second side wing from a rear end of the second armrest of uncover the second upwardly opening lap-belt receiver formed in the frame to expose a second lap-belt receiver gap provided between the second side wing and the second armrest to establish a booster-mode lap belt path through the uncovered first and second upwardly opening lap-belt receivers formed in the frame, and
wherein the slidable torso section is mounted for movement on the upright torso-section support toward the seat bottom away from the elevated position to assume a lowered position to cause the lower end of the first side wing to lie in close proximity to the rear end of the first armrest to cover the first upwardly opening lap-belt receiver formed in the frame and close the first lap-belt receiver gap and to cause the lower end of the second side wing to lie in close proximity to the rear end of the second armrest to cover the second upwardly opening lap-belt receiver formed in the frame and close the second lap-belt receiver gap to block reception of the lap belt in the first and second upwardly lap-belt receivers formed in the frame when the variable-height shell is in the convertible-car-seat mode.

11. The child restraint of claim 10, wherein the first armrest includes a rearwardly facing surface and the first-side portion of the upright torso-section support includes a forwardly facing surface that cooperates with the rearwardly facing surface of the first armrest to define the first upwardly lap-belt receiver therebetween.

12. The child restraint of claim 11, wherein the first-side portion of the upright torso-section support further includes a nose-shaped projection arranged to lie above and overhang the forwardly facing surface to form a lap-belt receiving undercut.

13. The child restraint of claim 12, wherein the nose-shaped projection and the forwardly facing surface of the first-side portion of the upright torso-section support are covered by the slidable torso section when the slidable torso section occupies the lowered position on the upright torso-section support.

14. The child restraint of claim 10, wherein the slidable torso section and the upright torso-section support cooperate to form a seat back that is arranged to extend upwardly from the seat bottom.

* * * * *